(12) United States Patent
Kumarasamy et al.

(10) Patent No.: US 9,367,548 B2
(45) Date of Patent: *Jun. 14, 2016

(54) SEARCH FILTERED FILE SYSTEM USING SECONDARY STORAGE, INCLUDING MULTI-DIMENSIONAL INDEXING AND SEARCHING OF ARCHIVED FILES

(71) Applicant: Commvault Systems, Inc., Tinton Falls, NJ (US)

(72) Inventors: Paramasivam Kumarasamy, Morganville, NJ (US); Prakash Varadharajan, Manalapan, NJ (US); Deepak Raghunath Attarde, Marlboro, NJ (US); Pavan Kumar Reddy Bedadala, Piscataway, NJ (US); Satish Chandra Kilaru, Manalapan, NJ (US)

(73) Assignee: Commvault Systems, Inc., Tinton Falls, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/717,255

(22) Filed: May 20, 2015

(65) Prior Publication Data

US 2015/0254254 A1 Sep. 10, 2015

Related U.S. Application Data

(63) Continuation of application No. 13/792,109, filed on Mar. 10, 2013, now Pat. No. 9,063,938.

(60) Provisional application No. 61/617,891, filed on Mar. 30, 2012.

(51) Int. Cl.
*G06F 17/30* (2006.01)

(52) U.S. Cl.
CPC .... *G06F 17/30073* (2013.01); *G06F 17/30091* (2013.01); *G06F 17/30333* (2013.01)

(58) Field of Classification Search
None
See application file for complete search history.

(56) References Cited

U.S. PATENT DOCUMENTS

| | | |
|---|---|---|
| 4,686,620 A | 8/1987 | Ng |
| 4,995,035 A | 2/1991 | Cole et al. |
| 5,005,122 A | 4/1991 | Griffin et al. |
| 5,093,912 A | 3/1992 | Dong et al. |

(Continued)

FOREIGN PATENT DOCUMENTS

| | | |
|---|---|---|
| EP | 0259912 A1 | 3/1988 |
| EP | 0405926 A2 | 1/1991 |

(Continued)

OTHER PUBLICATIONS

Armstead et al., "Implementation of a Campwide Distributed Mass Storage Service: The Dream vs. Reality," IEEE, Sep. 11-14, 1995, pp. 190-199.

(Continued)

*Primary Examiner* — Anh Tai Tran
(74) *Attorney, Agent, or Firm* — Perkins Coie LLP

(57) ABSTRACT

Techniques for enabling user search of content stored in a file archive include providing a search interface comprising a search rules portion and an action rules portion, receiving a file archive search criterion comprising at least one search rule, and searching the file archive using the search criterion. The techniques also include generating a set of files filtered using the search criterion and performing an action specified in the action rules portion on a file included in the set of files.

23 Claims, 11 Drawing Sheets

(56) References Cited

U.S. PATENT DOCUMENTS

| | | |
|---|---|---|
| 5,133,065 A | 7/1992 | Cheffetz et al. |
| 5,193,154 A | 3/1993 | Kitajima et al. |
| 5,212,772 A | 5/1993 | Masters |
| 5,226,157 A | 7/1993 | Nakano et al. |
| 5,239,647 A | 8/1993 | Anglin et al. |
| 5,241,668 A | 8/1993 | Eastridge et al. |
| 5,241,670 A | 8/1993 | Eastridge et al. |
| 5,276,860 A | 1/1994 | Fortier et al. |
| 5,276,867 A | 1/1994 | Kenley et al. |
| 5,287,500 A | 2/1994 | Stoppani, Jr. |
| 5,321,816 A | 6/1994 | Rogan et al. |
| 5,333,315 A | 7/1994 | Saether et al. |
| 5,347,653 A | 9/1994 | Flynn et al. |
| 5,410,700 A | 4/1995 | Fecteau et al. |
| 5,448,724 A | 9/1995 | Hayashi |
| 5,465,354 A | 11/1995 | Hirosawa et al. |
| 5,491,810 A | 2/1996 | Allen |
| 5,495,607 A | 2/1996 | Pisello et al. |
| 5,504,873 A | 4/1996 | Martin et al. |
| 5,544,345 A | 8/1996 | Carpenter et al. |
| 5,544,347 A | 8/1996 | Yanai et al. |
| 5,559,957 A | 9/1996 | Balk |
| 5,619,644 A | 4/1997 | Crockett et al. |
| 5,638,509 A | 6/1997 | Dunphy et al. |
| 5,673,381 A | 9/1997 | Huai et al. |
| 5,699,361 A | 12/1997 | Ding et al. |
| 5,729,743 A | 3/1998 | Squibb |
| 5,751,997 A | 5/1998 | Kullick et al. |
| 5,758,359 A | 5/1998 | Saxon |
| 5,761,677 A | 6/1998 | Senator et al. |
| 5,764,972 A | 6/1998 | Crouse et al. |
| 5,778,395 A | 7/1998 | Whiting et al. |
| 5,812,398 A | 9/1998 | Nielsen |
| 5,813,009 A | 9/1998 | Johnson et al. |
| 5,813,017 A | 9/1998 | Morris |
| 5,822,758 A | 10/1998 | Loper et al. |
| 5,875,478 A | 2/1999 | Blumenau |
| 5,887,134 A | 3/1999 | Ebrahim |
| 5,901,327 A | 5/1999 | Ofek |
| 5,909,594 A | 6/1999 | Ross et al. |
| 5,924,102 A | 7/1999 | Perks |
| 5,938,734 A | 8/1999 | Yao et al. |
| 5,950,205 A | 9/1999 | Aviani, Jr. |
| 5,974,563 A | 10/1999 | Beeler, Jr. |
| 6,021,415 A | 2/2000 | Cannon et al. |
| 6,026,414 A | 2/2000 | Anglin |
| 6,052,735 A | 4/2000 | Ulrich et al. |
| 6,076,148 A | 6/2000 | Kedem |
| 6,088,745 A | 7/2000 | Bertagna et al. |
| 6,094,416 A | 7/2000 | Ying |
| 6,131,095 A | 10/2000 | Low et al. |
| 6,131,190 A | 10/2000 | Sidwell |
| 6,134,482 A | 10/2000 | Iwasaki |
| 6,148,412 A | 11/2000 | Cannon et al. |
| 6,154,787 A | 11/2000 | Urevig et al. |
| 6,161,111 A | 12/2000 | Mutalik et al. |
| 6,167,402 A | 12/2000 | Yeager |
| 6,212,512 B1 | 4/2001 | Barney et al. |
| 6,243,824 B1 | 6/2001 | Kakuta et al. |
| 6,260,069 B1 | 7/2001 | Anglin |
| 6,269,431 B1 | 7/2001 | Dunham |
| 6,275,953 B1 | 8/2001 | Vahalia et al. |
| 6,301,592 B1 | 10/2001 | Aoyama et al. |
| 6,324,581 B1 | 11/2001 | Xu et al. |
| 6,328,766 B1 | 12/2001 | Long |
| 6,330,570 B1 | 12/2001 | Crighton |
| 6,330,642 B1 | 12/2001 | Carteau |
| 6,343,324 B1 | 1/2002 | Hubis et al. |
| 6,349,312 B1 | 2/2002 | Fresko et al. |
| RE37,601 E | 3/2002 | Eastridge et al. |
| 6,356,801 B1 | 3/2002 | Goodman et al. |
| 6,374,336 B1 | 4/2002 | Peters et al. |
| 6,389,432 B1 | 5/2002 | Pothapragada et al. |
| 6,421,711 B1 | 7/2002 | Blumenau et al. |
| 6,487,561 B1 | 11/2002 | Ofek et al. |
| 6,505,216 B1 | 1/2003 | Schutzman et al. |
| 6,519,679 B2 | 2/2003 | Devireddy et al. |
| 6,538,669 B1 | 3/2003 | Lagueux, Jr. et al. |
| 6,542,972 B2 | 4/2003 | Ignatius et al. |
| 6,553,369 B1 | 4/2003 | Guay et al. |
| 6,557,052 B1 | 4/2003 | Kubo |
| 6,564,228 B1 | 5/2003 | O'Connor |
| 6,587,431 B1 | 7/2003 | Almulhem et al. |
| 6,647,472 B2 | 11/2003 | Atkinson et al. |
| 6,658,526 B2 | 12/2003 | Nguyen et al. |
| 6,691,136 B2 | 2/2004 | Lee et al. |
| 6,760,765 B1 | 7/2004 | Asai et al. |
| 6,760,808 B2 | 7/2004 | Peters et al. |
| 6,952,828 B2 | 10/2005 | Greene |
| 6,981,260 B2 | 12/2005 | Brenner et al. |
| 6,993,767 B2 | 1/2006 | Brenner et al. |
| 7,010,626 B2 | 3/2006 | Kahle |
| 7,047,309 B2 | 5/2006 | Baumann et al. |
| 7,051,053 B2 | 5/2006 | Sinha |
| 7,069,354 B2 | 6/2006 | Pooni et al. |
| 7,111,115 B2 | 9/2006 | Peters et al. |
| 7,159,072 B2 | 1/2007 | Kitamura |
| 7,161,907 B2 | 1/2007 | Mott |
| 7,161,994 B2 | 1/2007 | Shah et al. |
| 7,177,913 B2 | 2/2007 | Connor |
| 7,177,992 B2 | 2/2007 | Kappler |
| 7,188,367 B1 | 3/2007 | Edwards et al. |
| 7,238,218 B2 | 7/2007 | Hepner et al. |
| 7,251,691 B2 | 7/2007 | Boyd et al. |
| 7,287,133 B2 | 10/2007 | Rowan et al. |
| 7,406,473 B1 | 7/2008 | Brassow et al. |
| 7,421,710 B2 | 9/2008 | Qi et al. |
| 7,460,149 B1 | 12/2008 | Donovan et al. |
| 7,475,210 B2 | 1/2009 | Yamada |
| 7,487,309 B2 | 2/2009 | Peters et al. |
| 7,499,715 B2 | 3/2009 | Carro et al. |
| 7,519,769 B1 | 4/2009 | Kulkarni et al. |
| 7,562,362 B1 | 7/2009 | Paquette et al. |
| 7,606,967 B2 | 10/2009 | Konno |
| 7,631,076 B2 | 12/2009 | Cannon et al. |
| 7,757,013 B1 | 7/2010 | Lawson et al. |
| 7,793,000 B2 | 9/2010 | Rosenau |
| 7,818,530 B2 | 10/2010 | Gold et al. |
| 7,831,766 B2 | 11/2010 | Gokhale et al. |
| 7,843,907 B1 | 11/2010 | Abou-Emara et al. |
| 7,873,153 B2 | 1/2011 | Bukovec et al. |
| 7,873,700 B2 | 1/2011 | Pawlowski et al. |
| 7,877,558 B2 | 1/2011 | Hughes et al. |
| 7,940,756 B1 | 5/2011 | Duffy et al. |
| 7,958,507 B2 | 6/2011 | Santos et al. |
| 7,975,061 B1 | 7/2011 | Gokhale et al. |
| 7,996,458 B2 | 8/2011 | Nielsen et al. |
| 8,046,558 B2 | 10/2011 | Ghose |
| 8,141,078 B2 | 3/2012 | Abernethy, Jr. et al. |
| 8,205,205 B2 | 6/2012 | Franke |
| 8,402,322 B2 | 3/2013 | Herz et al. |
| 8,438,346 B2 | 5/2013 | Gold |
| 8,468,538 B2 | 6/2013 | Attarde et al. |
| 8,832,706 B2 | 9/2014 | Gokhale et al. |
| 2003/0156589 A1 | 8/2003 | Suetsugu |
| 2004/0205108 A1* | 10/2004 | Tanaka ............... G06F 9/4881 709/201 |
| 2004/0244001 A1 | 12/2004 | Haller et al. |
| 2005/0210472 A1 | 9/2005 | Accapadi et al. |
| 2006/0126559 A1 | 6/2006 | Jun et al. |
| 2006/0259725 A1 | 11/2006 | Saika et al. |
| 2007/0022148 A1 | 1/2007 | Akers et al. |
| 2007/0050778 A1 | 3/2007 | Lee et al. |
| 2007/0067595 A1* | 3/2007 | Ghose ............... G06F 3/0611 711/167 |
| 2007/0094402 A1 | 4/2007 | Stevenson et al. |
| 2008/0195824 A1 | 8/2008 | Sadovsky et al. |
| 2008/0235317 A1 | 9/2008 | Burgmans |
| 2010/0332401 A1 | 12/2010 | Prahlad et al. |

(56) References Cited

U.S. PATENT DOCUMENTS

| | | |
|---|---|---|
| 2010/0333116 A1 | 12/2010 | Prahlad et al. |
| 2013/0262615 A1 | 10/2013 | Ankireddypalle et al. |
| 2013/0282774 A1 | 10/2013 | Attarde et al. |

FOREIGN PATENT DOCUMENTS

| | | |
|---|---|---|
| EP | 0467546 A2 | 1/1992 |
| EP | 0774715 A1 | 5/1997 |
| EP | 0809184 A1 | 11/1997 |
| EP | 0899662 A1 | 3/1999 |
| EP | 0981090 A1 | 2/2000 |
| WO | WO-9513580 A1 | 5/1995 |
| WO | WO-9912098 A1 | 3/1999 |

OTHER PUBLICATIONS

Arneson, "Mass Storage Archiving in Network Environments," Digest of Papers, Ninth IEEE Symposium on Mass Storage Systems, Oct. 31, 1988-Nov. 3, 1988, pp. 45-50, Monterey, CA.

Cabrera et al., "ADSM: A Multi-Platform, Scalable, Backup and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.

Eitel, "Backup and Storage Management in Distributed Heterogeneous Environments," *IEEE*, Jun. 12-16, 1994, pp. 124-126.

Gait, J., "The Optical File Cabinet: A Random-Access File System for Write-Once Optical Disks," *IEEE Computer*, vol. 21, No. 6, pp. 11-22 (Jun. 1988).

Jander, M., "Launching Storage-Area Net," *Data Communications*, US, McGraw Hill, NY, vol. 27, No. 4 (Mar. 21, 1998), pp. 64-72.

Rosenblum et al., "The Design and Implementation of a Log-Structured File System," *Operating Systems Review SIGOPS*, vol. 25, No. 5, New York, US, pp. 1-15 (May 1991).

U.S. Appl. No. 14/293,546, filed Jun. 2, 2014, Klose et al.

U.S. Appl. No. 14/630,139, filed Feb. 24, 2015, Thanasekaran et al.

U.S. Appl. No. 13/792,109, filed Mar. 10, 2013, titled Search Filtered File System Using Secondary Storage.

\* cited by examiner

SEARCH FILTERED FILE SYSTEM USING SECONDARY STORAGE, INCLUDING MULTI-DIMENSIONAL INDEXING AND SEARCHING OF ARCHIVED FILES

CROSS-REFERENCE TO RELATED APPLICATIONS

The present document claims the benefit of priority under 35 U.S.C. 119(e) from U.S. Provisional Patent 61/617,891, entitled "SEARCH FILTERED FILE SYSTEM USING SECONDARY STORAGE," filed on Mar. 30, 2012, incorporated by reference herein. The present application is a Continuation of U.S. patent application Ser. No. 13/792,109, entitled "SEARCH FILTERED FILE SYSTEM USING SECONDARY STORAGE, INCLUDING MULTI-DIMENSIONAL INDEXING AND SEARCHING OF ARCHIVED FILES," filed on Mar. 10, 2013, now U.S. Pat. No. 9,063,938, and which is incorporated by reference in its entirety herein.

BACKGROUND

A primary copy of data is generally a production copy or other "live" version of the data which is used by a software application and is generally in the native format of that application. Primary copy data may be maintained in a local memory or other high-speed storage device that allows for relatively fast data access if necessary. Such primary copy data is typically intended for short term retention (e.g., several hours or days) before some or all of the data is stored as one or more secondary copies, for example, to prevent loss of data in the event a problem occurred with the data stored in primary storage.

To protect primary copy data or for other purposes, such as regulatory compliance, secondary copies (alternatively referred to as "data protection copies") can be made. Examples of secondary copies include a backup copy, a snapshot copy, a hierarchical storage management ("HSM") copy, an archive copy, and other types of copies.

A backup copy is generally a point-in-time copy of the primary copy data stored in a backup format as opposed to in native application format. For example, a backup copy may be stored in a backup format that is optimized for compression and efficient long-term storage. Backup copies generally have relatively long retention periods and may be stored on media with slower retrieval times than other types of secondary copies and media. In some cases, backup copies may be stored at an offsite location.

After an initial, full backup of a data set is performed, periodic, intermittent, or continuous incremental backup operations may be subsequently performed on the data set. Each incremental backup operation copies only the primary copy data that has changed since the last full or incremental backup of the data set was performed. In this way, even if the entire set of primary copy data that is backed up is large, the amount of data that must be transferred during each incremental backup operation may be significantly smaller, since only the changed data needs to be transferred to secondary storage. Combined, one or more full backup and subsequent incremental copies may be utilized together to periodically or intermittently create a synthetic full backup copy. More details regarding synthetic storage operations are found in commonly-assigned U.S. patent application Ser. No. 12/510,059, entitled "Snapshot Storage and Management System with Indexing and User Interface," filed Jul. 27, 2009, now U.S. Pat. No. 7,873,806, which is hereby incorporated by reference herein in its entirety.

An archive copy is generally a copy of the primary copy data, but typically includes only a subset of the primary copy data that meets certain criteria and is usually stored in a format other than the native application format. For example, an archive copy might include only that data from the primary copy that is larger than a given size threshold or older than a given age threshold and that is stored in a backup format. Often, archive data is removed from the primary copy, and a stub is stored in the primary copy to indicate its new location. When a user requests access to the archive data that has been removed or migrated, systems use the stub to locate the data and often make recovery of the data appear transparent, even though the archive data may be stored at a location different from the remaining primary copy data.

Archive copies are typically created and tracked independently of other secondary copies, such as other backup copies. For example, to create a backup copy, the data storage system transfers a secondary copy of primary copy data to secondary storage and tracks the backup copy using a backup index separate from the archive index. To create an archive copy, a conventional data storage system transfers the primary copy data to be archived to secondary storage to create an archive copy, replaces the primary copy data with a stub, and tracks the archive copy using an archive index. Accordingly, the data storage system will transfer two separate times to secondary storage a primary copy data object that is both archived and backed-up.

Users often need to access files in a secondary or a backup storage with a specific search context in their mind. For example, a user may need to access photo files from his last Hawaii trip, archived on a storage system, or all documents that include the word "taxes" and so on. Such a context-sensitive search is cumbersome using presently available techniques in which a user has to speculatively mount archived file folders to the user's computer and then sift through all files in the mounted drive to look for files of interest.

In other operational scenarios, a user may want to access a specific portion of an archived media file, such as a home video. Alternatively, a user may want to access the archived home video starting at a specific point in the video file. A user may experience long delays in fulfilling such requests using conventional techniques in which mounting of the video file may take a significant amount of time. Furthermore, such user activities may tie up valuable computational resources needed for mounting files from archives to a local memory and transferring data between the user device and a secondary storage location.

The need exists for systems and methods that overcome the above problems, as well as systems and methods that provide additional benefits. Overall, the examples herein of some prior or related systems and methods and their associated limitations are intended to be illustrative and not exclusive. Other limitations of existing or prior systems and methods will become apparent to those of skill in the art upon reading the following Detailed Description.

DETAILED DESCRIPTION

Figure 1:
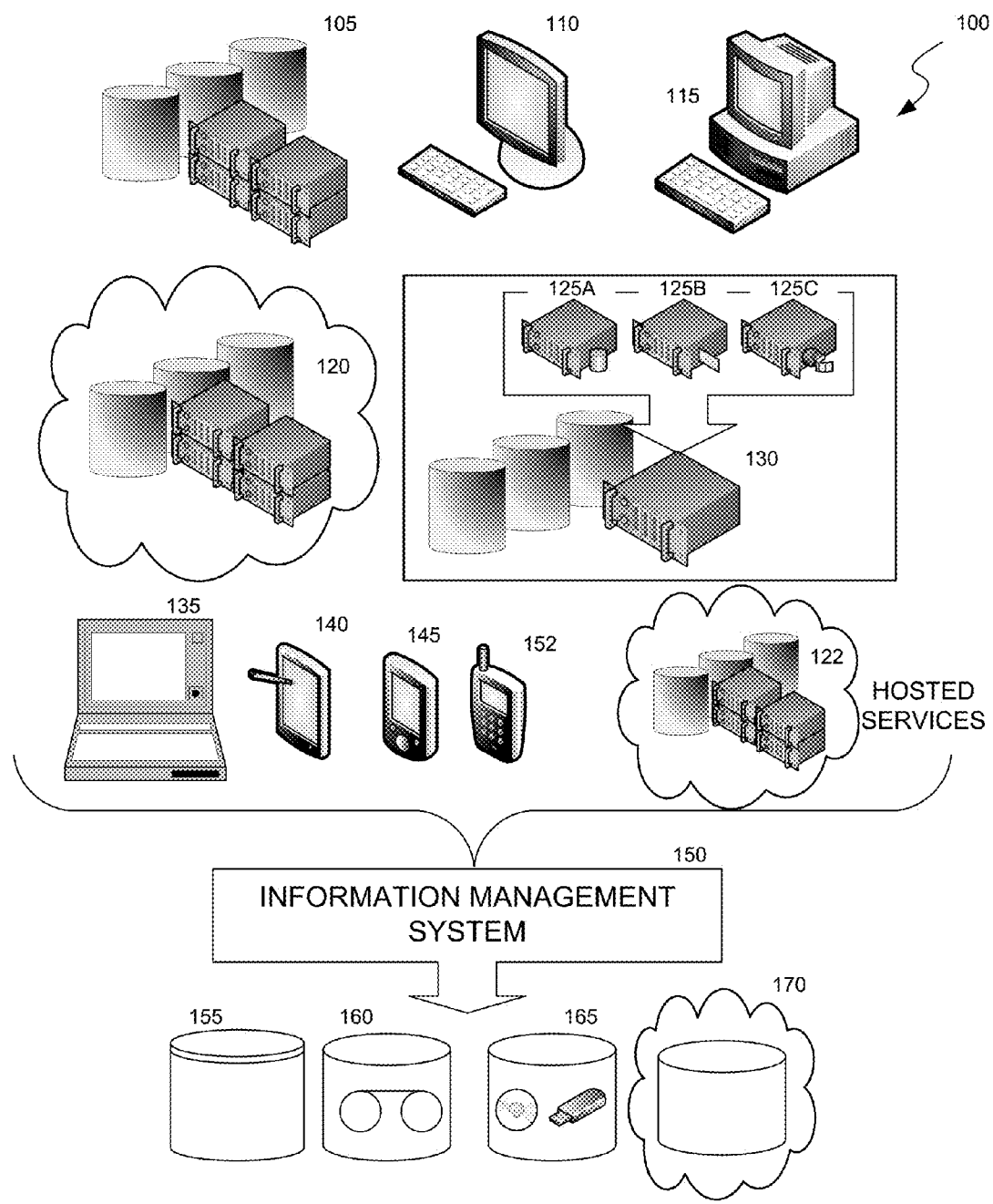
FIG. 1 is a block diagram illustrating an example of suitable information management environment in which aspects of the inventive system may operate.

The techniques disclosed in this document are useful, in one aspect, in solving the above-discussed problems related to searching for and within files stored in an archived file folder. In another aspect, the techniques are useful in providing quick response to a user's requests to view a portion of media content from an archived media file such as a digital video or audio file.

The headings provided herein are for convenience only and do not necessarily affect the scope or meaning of the disclosure.

Overview

A software, firmware, and/or hardware system is disclosed that, among other things, performs a multi-dimensional indexing of files during archival of the files to a secondary storage. The results of the indexing are stored at a network location that may be separate from or the same as the location of storage of the archive files. Furthermore, techniques are disclosed that allow a user to search for a file or content within a file using a specific search criterion. In one aspect, the search experience is simplified for a user by mounting only the files that meet the search criteria to a local copy of the archive. In another aspect, media files, which often are relatively large in size, are staged or streamed in smaller pieces from the archive copy, based on search parameters provided by the user.

In one implementation, a network file system (NFS) server is used to provide an NFS service to a user. The NFS service provides an interface to an underlying index (e.g., a c-tree index) that represents the contents of secondary copies of media files, such as backup copies or deduplicated, archive copies of media files. A user can use a standard NFS client to connect to this NFS service and browse a directory structure of the secondary copies of media files and seek or "fast forward" to random offsets within a secondary copy of a media file, without needing to restore the entire media file.

The NFS service allows files to be seen and accessed via different client devices. The NFS service acts as an interface to secondary files, such as archived media files. Under one implementation, the user can mount a shared file system or a drive, which fits the user's search criteria, exported by the NFS service to his NFS client device. A client device sends an rpc (remote procedure call) to access files and folders that match the search criteria. The NFS service processes the RPC by consulting with the index to identify the location of the desired data, such as a media or video file stored in secondary storage. The system may then retrieve a portion (as desired by the client) of the video file for delivery to the requesting client.

If the video file is provided, the client may issue a seek command to "fast forward" to another point in the video. In response, the system again traps the seek command at the NFS. The system determines an appropriate offset from a start of the video (e.g. determines a jump to ⅔ into the video from a GUI of a video/media player) and determines a proportional or estimated offset of the video file. If the secondary copy of the video includes a data structure or file system indicating a number of blocks for the video file, then the system can jump to a block approximately ⅔ of the total number of blocks for the video file.

Various examples of the techniques will now be described. The following description provides specific details for a thorough understanding and enabling description of these examples. One skilled in the relevant art will understand, however, that the invention may be practiced without many of these details. Likewise, one skilled in the relevant art will also understand that the invention may include many other obvious features not described in detail herein. Additionally, some well-known structures or functions may not be shown or described in detail below, so as to avoid unnecessarily obscuring the relevant description.

The terminology used below is to be interpreted in its broadest reasonable manner, even though it is being used in conjunction with a detailed description of certain specific examples of the invention. Indeed, certain terms may even be emphasized below; however, any terminology intended to be interpreted in any restricted manner will be overtly and specifically defined as such in this Detailed Description section.

Information Management Environment

Aspects of the technologies described herein may be practiced in an information management environment 100, which will now be described while referencing FIG. 1. As shown in FIG. 1, the environment 100 includes multiple computing devices that execute numerous software applications to facilitate the operations of an organization (or multiple affiliated organizations), such as a household, corporation or other business entity, a non-profit organization, an educational institution, or a governmental agency. The computing devices may include one or more: servers 105 (such as mail servers, file servers, database servers, print servers, and web servers), personal computers 110, workstations 115, or other types of fixed computing systems such as mainframe computers and minicomputers (not shown). The servers 105 may include network-attached storage (NAS) filers.

The environment 100 may include virtualized computing resources, such as a virtual machine 120 provided to the organization by a third-party cloud service vendor or a virtual machine 125 running on a virtual machine host 130 operated by the organization. For example, the organization may use one virtual machine 125A as a database server and another virtual machine 125B as a mail server. The environment 100 may also include mobile or portable computing devices, such as laptops 135, tablet computers 140, personal data assistants 145, mobile phones 152 (such as smartphones), and other mobile or portable computing devices such as embedded computers, set top boxes, vehicle-mounted devices, wearable computers, etc.

Of course, other types of computing devices may form part of the environment 100. As part of their function, each of these computing devices creates, accesses, modifies, writes, and otherwise uses production copies of data and metadata that are typically stored in a persistent storage medium having fast I/O times. For example, each computing device may regularly access and modify data files and metadata stored on semiconductor memory, a local disk drive or a network-attached storage device. Each of these computing devices may access data and metadata via a file system supported by an operating system of the computing device.

The environment 100 may also include hosted services 122 that provide various online services to the organization or its constituent members (e.g., the organization's departments, employees, independent contractors, etc.) such as social networking services (e.g., Facebook, Twitter, Pinterest), hosted email services (e.g., Gmail, Yahoo Mail, Hotmail), or hosted productivity applications or other hosted applications (e.g., Microsoft Office 365, Google Docs, Salesforce.com). Hosted services may include software-as-a-service (SaaS), platform-as-a-service (PaaS), application service providers (ASPs), cloud services, and all manner of delivering computing or functionality via a network. As it provides services to users, each hosted service may generate additional "hosted data and metadata" that is associated with each user. For example, Facebook may generate and store photos, wall posts, notes, videos, and other content that are associated with a particular Facebook user's account.

The organization directly or indirectly employs an information management system 150 to protect and manage the data and metadata used by the various computing devices in the environment 100 and the data and metadata that is maintained by hosted services on behalf of users associated with the organization. One example of an information management system is the CommVault Simpana® software system, available from CommVault Systems, Inc. of Oceanport, N.J. The information management system creates and manages non-production copies of the data and metadata to meet information management goals, such as: permitting the organization to restore data, metadata or both data and metadata if an original copy of the data/metadata is lost (e.g., by deletion, corruption, or disaster, or because of a service interruption by a hosted service); allowing data to be recovered from a previous time; complying with regulatory data retention and electronic discovery ("e-discovery") requirements; reducing the amount of data storage media used; facilitating data organization and search; improving user access to data files across multiple computing devices and/or hosted services; and implementing information lifecycle management ("ILM") or other data retention policies for the organization. The information management system 150 may create the additional non-production copies of the data and metadata on any suitable non-production storage medium such as magnetic disks 155, magnetic tapes 160, other storage media 165 such as solid-state storage devices or optical disks, or on cloud data storage sites 170 (e.g. those operated by third-party vendors). Further details on the information management system may be found in the assignee's U.S. patent application Ser. No. 12/751,850, filed Mar. 31, 2010 entitled DATA OBJECT STORE AND SERVER FOR A CLOUD STORAGE ENVIRONMENT, INCLUDING DATA DEDUPLICATION AND DATA MANAGEMENT ACROSS MULTIPLE CLOUD STORAGE SITES, now U.S. Pat. No. 8,285,681, which is hereby incorporated herein by reference in its entirety.

Figure 2:
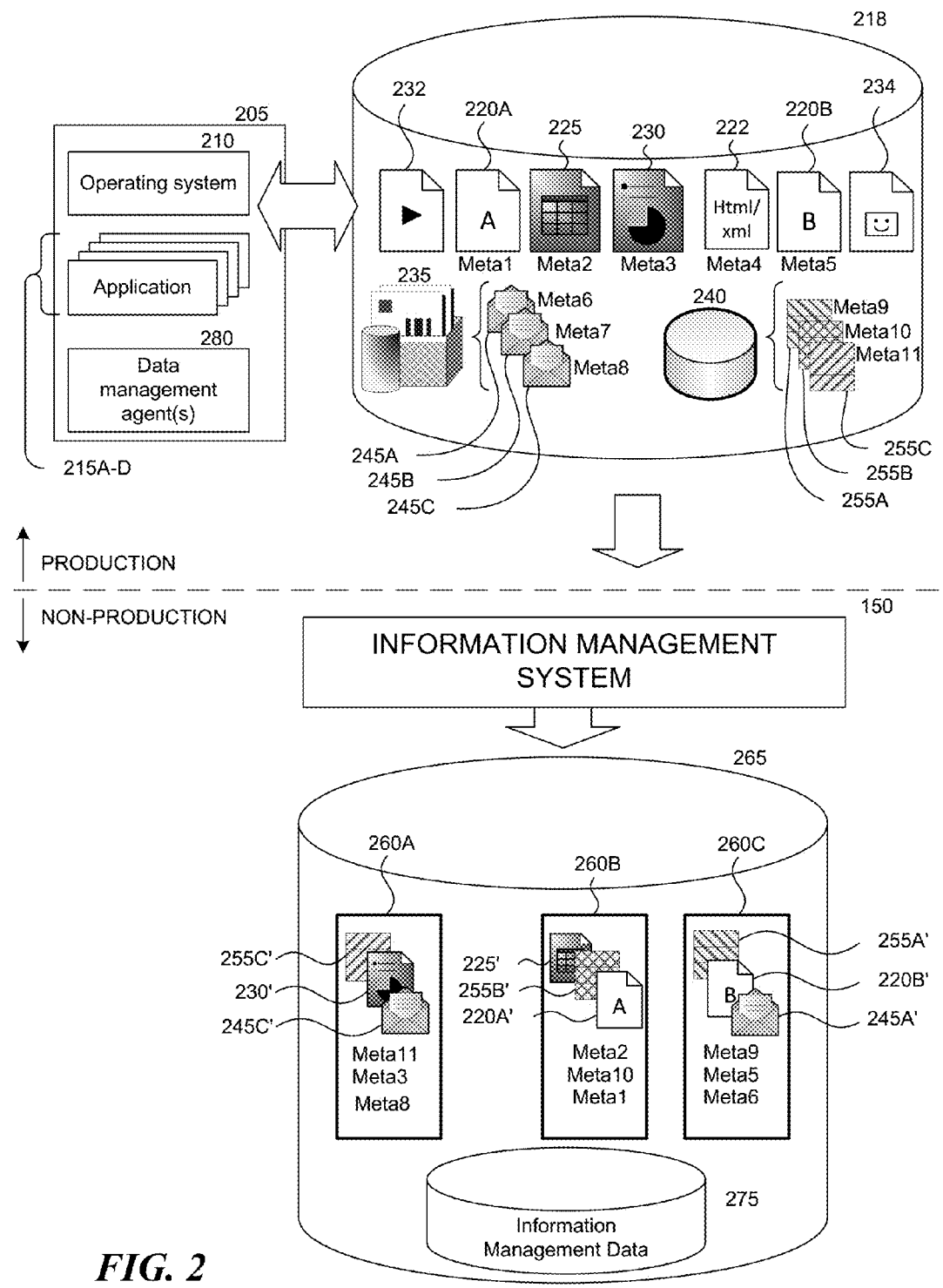
FIG. 2 illustrates examples of production and non-production data that may be processed by the information management environment of FIG. 1.

FIG. 2 helps illustrates some differences between "production copies" of data and metadata and "non-production copies" of data and metadata in the data management environment 100. As shown, each computing device 205 in the environment 100 has at least one operating system 210 installed and one or more applications 215A-D, such as mail server applications, file server applications, mail client applications, database applications, word processing applications, spreadsheet applications, presentation applications, browser applications, mobile applications, entertainment applications, and so on. Each application can access and modify various production copies of files stored in a production data storage medium 218, which may be a network attached storage filer or form part of a Hadoop distributed file system, Open VMS file system, or other type of distributed file system, simply by making conventional file system calls via the operating system 210, without needing the information management system 150 to intervene on behalf of the operating system or application. The production copies of files may include structured data (e.g., database files), unstructured data (e.g., documents), and/or semi-structured data, and thus may include one or more documents 220A-B, spreadsheets 225, presentation documents 230, video files 232, image files 234, email mailboxes 235, html/xml or other types of markup language files 222, and/or databases 240. The operating system 210 may also access and modify production copies of files and other data, such as files in a system volume and/or boot volume. The hosted data and metadata used by a hosted service are also "production copies" of data and metadata since the hosted service accesses and modifies the user's data and metadata as part of its services. Production copies of data may include not only files, but also subsets of files, each of which a related application 215 or the operating system 210 treats as an independent functional unit, but which is not separately addressed in the associated file system. For example, a single email mailbox 235 may include multiple email messages 245A-C, email headers, and attachments. As another example, a single database 240 may include multiple tables 255A-C. As used herein, a "data object" refers to both (1) any file that is currently or previously addressable by a file system and (2) a functional subset of such a file that has a particular function for a related application 215A-D or the operating system 210. Each data object may be further decomposed into one or more data blocks each of which is a collection of data bits within the data object that may not have any particular function for a related application or the operating system. In addition to data objects, the operating system 210 and applications 215A-D may also access and modify production copies of metadata, such as boot sectors, partition layouts, file or data object metadata (e.g., file name, file size, creation/modification/access timestamps, file location within a file folder directory structure, user permissions, owners, groups, access control lists ("ACLs")), and system metadata (e.g., registry information). In addition to metadata generated by or related to file systems and operating systems, some applications maintain indices of production metadata for data objects, e.g., metadata associated with individual email messages. Thus, as shown in FIG. 2, each data object may be associated with a production copy of object metadata ("Meta1-11"), which may be file system metadata and/or application-specific metadata.

The information management system 150 accesses or receives copies of the various production copies of data objects and metadata, and via an information management operation (such as a backup operation, archive operation, or snapshot operation), creates non-production copies of these data objects and metadata, often stored in one or more non-production storage mediums 265 different than the production storage medium 218 where the production copies of the data objects and metadata reside. A non-production copy of a data object represents the production data object and its associated metadata at a particular point in time (non-production objects 260A-C). Since a production copy of a data object or metadata changes over time as it is modified by an application 215, hosted service 122, or the operating system 210, the information management system 150 may create and manage multiple non-production copies of a particular data object or metadata, each representing the state of the production data object or metadata at a particular point in time. Moreover, since a production copy of a data object may eventually be deleted from the production data storage medium and the file system from which it originated, the information management system may continue to manage point-in-time representations of that data object, even though a production copy of the data object itself no longer exists.

For virtualized computing devices, such as virtual machines, the operating system 210 and applications 215A-D may be running on top of virtualization software, and the production data storage medium 218 may be a virtual disk created on a physical medium such as a physical disk. The information management system may create non-production copies of the discrete data objects stored in a virtual disk file (e.g., documents, email mailboxes, and spreadsheets) and/or non-production copies of the entire virtual disk file itself (e.g., a non-production copy of an entire .vmdk file).

Each non-production object 260A-C may contain copies of or otherwise represent more than one production data object. For example, non-production object 260A represents three separate production data objects 255C, 230 and 245C (represented as 245C', 230' and 245', respectively). Moreover, as indicated by the prime mark ('), a non-production object may store a representation of a production data object or metadata differently than the original format of the data object or metadata, e.g., in a compressed, encrypted, deduplicated, or otherwise optimized format. Although FIG. 2 shows that a single production data object (e.g., 255C), and its associated data object metadata (e.g., Meta11) are represented by the contents of only a single non-production object (e.g., 260A), the entire contents of a single production data object and/or its metadata at a particular point in time may instead span across numerous non-production objects. Also a single non-production object 260 may contain copies of or otherwise represent production data objects that originated from different computing devices.

Non-production copies include backup copies, archive copies, and snapshot copies. Backup copies are generally used for shorter-term data protection and restoration purposes and may be in a native application format or in a non-native format (e.g., compressed, encrypted, deduplicated, and/or otherwise modified from the original application format). Archive copies are generally used for long-term data storage purposes and may be compressed, encrypted, deduplicated and/or otherwise modified from the original application format. In some examples, when an archive copy of a data object is made, a logical reference or stub may be used to replace the production copy of the data object in the production storage medium 218. In such examples, the stub may point to or otherwise reference the archive copy of the data object stored in the non-production storage medium so that the information management system can retrieve the archive copy if needed. The stub may also include some metadata associated with the data object, so that a file system and/or application can provide some information about the data object and/or a limited-functionality version (e.g., a preview) of the data object. A snapshot copy represents a data object at a particular point in time. A snapshot copy can be made quickly and without significantly impacting production computing resources because large amounts of data need not be copied or moved. A snapshot copy may include a set of pointers derived from the file system or an application, where each pointer points to a respective stored data block, so collectively, the set of pointers reflect the storage location and state of the data object at a particular point in time when the snapshot copy was created. In "copy-on-write", if a block of data is to be deleted or changed, the snapshot process writes the block to a particular data storage location, and the pointer for that block is now directed to that particular location. The set of pointers and/or the set of blocks pointed to by a snapshot may be stored within the production data storage medium 218.

Non-production copies of a data object or metadata may be distinguished from a production copy of a data object or metadata in several ways. First, a non-production copy of a data object is created to meet the different information management goals described above and is not directly used or modified by applications 215A-D, hosted services 122, or the operating system 210. Second, a non-production copy of a data object is stored as one or more non-production objects 260 that may have a format different from the native application format of the production copy of the data object, and thus often cannot be directly used by the native application or a hosted service 122 without first being modified. Third, non-production objects are often stored on a non-production storage medium 265 that is inaccessible to the applications 215A-D running on computing devices and hosted services 122. Also, some non-production copies may be "offline copies," in that they are not readily available (e.g. not mounted tape or disk.) Offline copies include copies of data that the information management system can access without any human intervention (e.g. tapes within an automated tape library, but not yet mounted in a drive), and copies that the information management system 150 can access only with at least some human intervention (e.g. tapes located at an offsite storage site).

The information management system 150 also generates information management data 275, such as indexing information, that permit the information management system to perform its various information management tasks. As shown in FIG. 2, a computing device 205 may include one or more data management agents 280 that provide client-side functions for the information management system.

Information Management System

Figure 3:
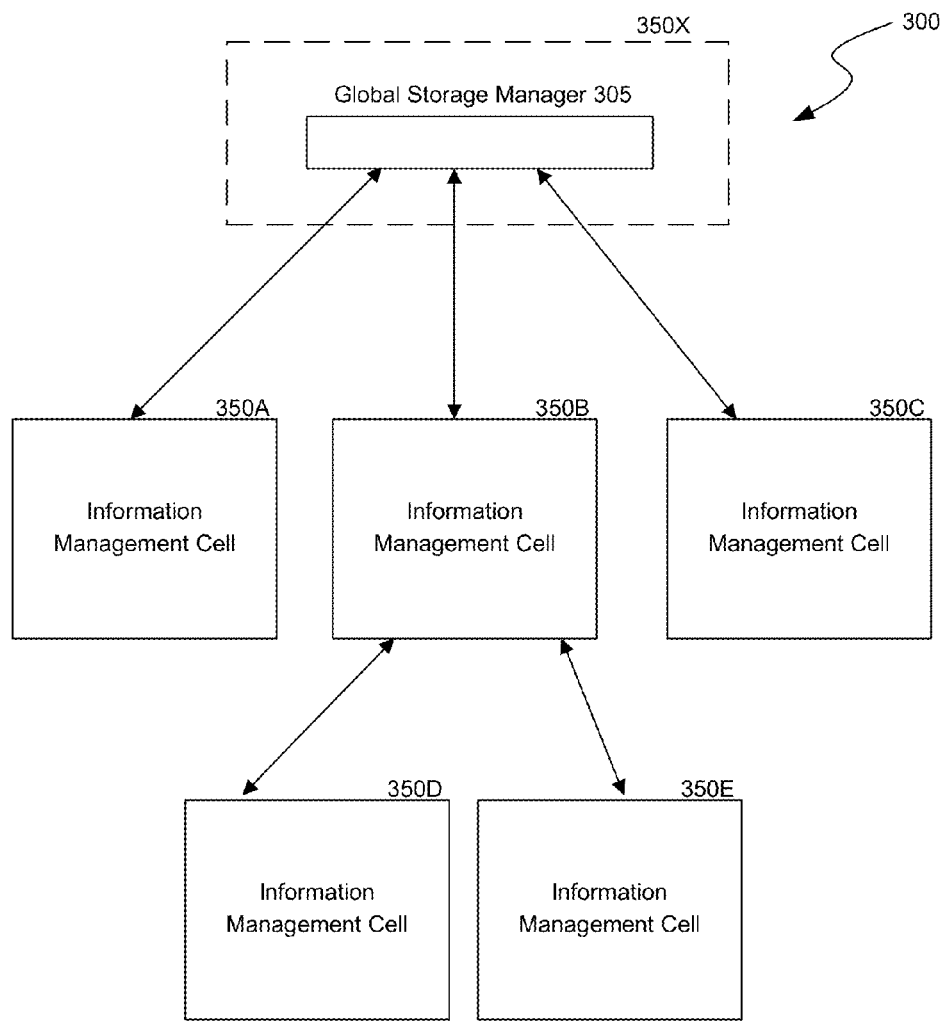
FIG. 3 is a block diagram illustrating one example of a hierarchical arrangement of resources for the information management system of FIG. 1, including information management cells.

FIG. 3 shows a hierarchical arrangement of resources that may form an information management system 300. As shown, the information management system 300 includes multiple information management cells 350 arranged in a hierarchy, with some information management cells (e.g., 350D-E) subordinate to other information management cells (e.g., 350B). A global storage manager 305, which may form part of a global information cell 350x, manages the overall hierarchy of information management cells by receiving reports from the various subordinate information management cells related to the operation of the cells, determining global information management policies in light of received reports, and pushing information management policies towards subordinate cells for implementation. The global storage manager may also maintain and disseminate, to the various cells, system-wide information management data. A superior information management cell (e.g., 350B), may perform similar tasks for its subordinate cells (e.g., 350D-E) and/or otherwise act as an intermediary between the subordinate cells and the global storage manager 305.

Information Management Cell

Figure 4:
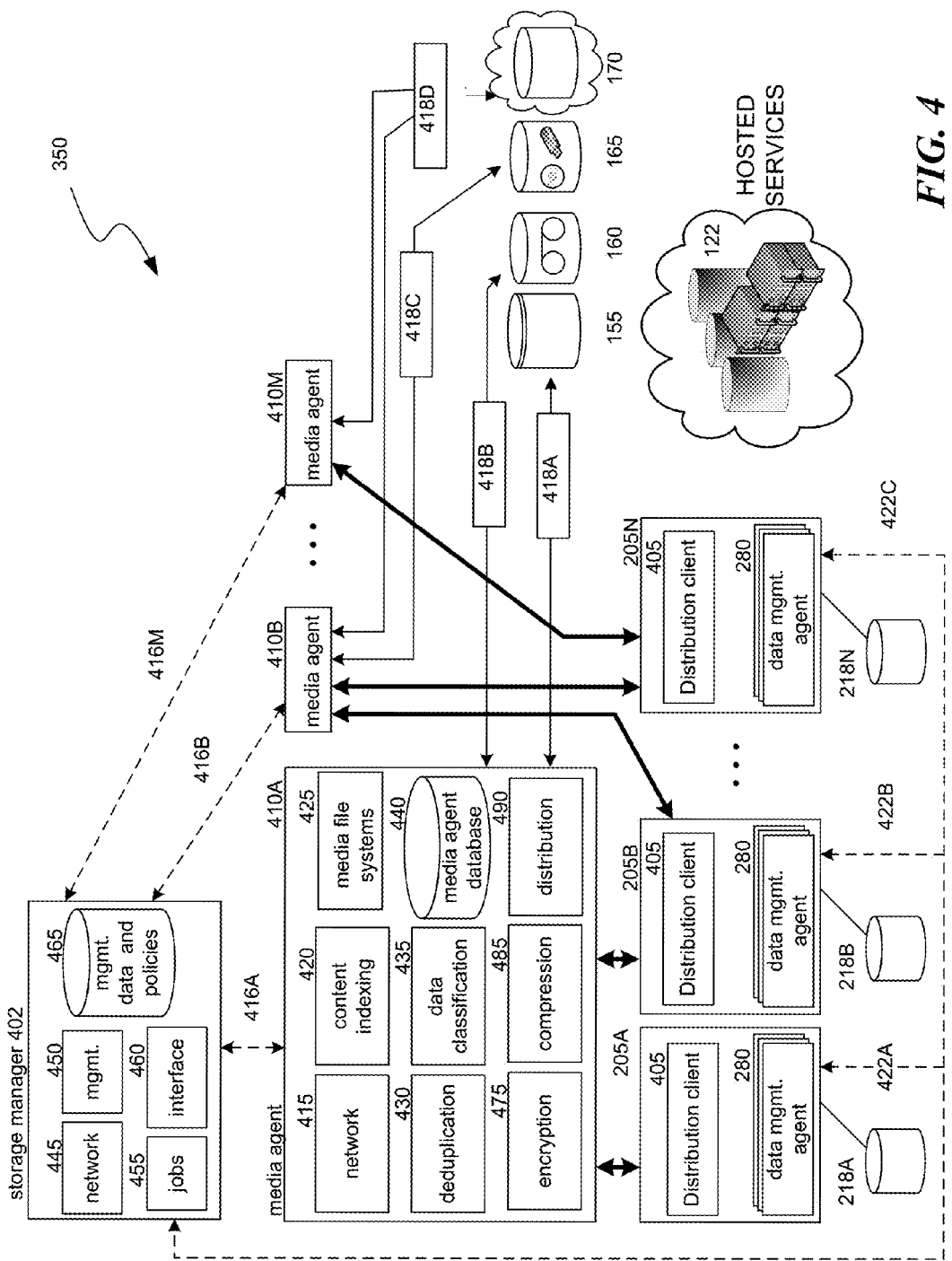
FIG. 4 is a block diagram illustrating an example of resources forming an information management cell.

FIG. 4 shows an arrangement of resources that may form an information management cell 350. As shown, the information management cell includes a storage manager 402, one or more media agents 410A-M, one or more non-production storage mediums 155-170, one or more computing devices 205A-N, and one or more production data storage mediums 218A-N. Outside of the information management cell are hosted services 122, which may interact with media agents 410 and its components, as described further herein. In some examples, all or a portion of an information management cell may be implemented as an object store, as described in assignee's U.S. patent application Ser. No. 12/751,850 (introduced above).

The storage manager 402 may be a software module or other application that coordinates and controls information management operations performed by one or more information management cells 350 to protect and control copies of non-production data objects and metadata. As shown by the dashed lines 416 and 422, the storage manager may communicate with some or all elements of the information management cell 350, such as the media agents 410 and computing devices 205, to initiate and manage backup operations, snapshot operations, archive operations, data replication operations, data migrations, data distributions, data recovery, and other information management operations. The storage manager may control additional information management operations including ILM, deduplication, content indexing, data classification, data mining or searching, e-discovery management, collaborative searching, encryption, and compression. Alternatively or additionally, a storage manager may control the creation and management of disaster recovery copies, which are often created as secondary, high-availability disk copies, using auxiliary copy or replication technologies.

The storage manager 402 may include a jobs agent 455, a management agent 450, a network agent 445, and an interface agent 460, all of which may be implemented as interconnected software modules or application programs. The jobs agent 455 monitors the status of information management operations previously performed, currently being performed, or scheduled to be performed by the information management cell 350. The management agent 450 provides an interface that allows various management agents 450 in multiple information management cells 350 (or in a global storage manager 305) to communicate with one another. This allows each information management cell 350 to exchange status information, routing information, capacity and utilization information, and information management operation instructions or policies with other cells. In general, the network agent 445 provides the storage manager 402 with the ability to communicate with other components within the information management cell and the larger information management system, e.g., via proprietary or non-proprietary network protocols and application programming interfaces ("APIs") (including HTTP, HTTPS, FTP, REST, virtualization software APIs, cloud service provider APIs, hosted service provider APIs). The interface agent 460 includes information processing and display software, such as a graphical user interface ("GUI"), an API, or other interactive interface through which users and system processes can retrieve information about the status of information management operations or issue instructions to the information management cell and its constituent components. The storage manager 402 may also track information that permits it to select, designate, or otherwise identify content indices, deduplication databases, or similar databases within its information management cell (or another cell) to be searched in response to certain queries.

The storage manager 402 may also maintain information management data, such as a database 465 of management data and policies. The database 465 may include a management index that stores logical associations between components of the system, user preferences, user profiles (that among other things, map particular information management users to computing devices or hosted services), management tasks, or other useful data. The database 465 may also include various "information management policies," which are generally data structures or other information sources that each include a set of criteria and rules associated with performing an information management operation. The criteria may be used to determine which rules apply to a particular data object, system component, or information management operation, an may include:

frequency with which a production or non-production copy of a data object or metadata has been or is predicted to be used, accessed, or modified;
access control lists or other security information;
the sensitivity (e.g., confidentiality) of a data object as determined by its content and/or metadata;
time-related factors;
deduplication information;
the computing device, hosted service, computing process, or user that created, modified, or accessed a production copy of a data object; and
an estimated or historic usage or cost associated with different components.

The rules may specify, among other things:
a schedule for performing information management operations,
a location (or a class or quality of storage media) for storing a non-production copy,
preferences regarding the encryption, compression, or deduplication of a non-production copy,
resource allocation between different computing devices or other system components (e.g., bandwidth, storage capacity),
whether and how to synchronize or otherwise distribute files or other data objects across multiple computing devices or hosted services,
network pathways and components to utilize (e.g., to transfer data) during an information management operation, and
retention policies (e.g., the length of time a non-production copy should be retained in a particular class of storage media).

As noted above, each computing device 205 may include one or more data management agents 280. Each data management agent is a software module or component that helps govern communications with other system components. For example, the data management agent receives commands from the storage manager 402 and sends to and receives from media agents 410 copies of data objects, metadata, and other payload (as indicated by the heavy arrows). Each data management agent accesses data and/or metadata stored in a production data storage medium 218 and arranges or packs the data and metadata in a certain format (e.g., backup or archive format) before it is transferred to another component. Each data management agent can also restore a production copy of a data object or metadata in a production data storage medium 218 from a non-production copy. A data management agent may perform some functions provided by a media agent, which are described further herein, such as compression, encryption, or deduplication. Each data management agent may be specialized for a particular application (e.g. a specified data management agent customized to handle data generated or used by Exchange by Microsoft Corp.). Alternatively or additionally, a more generic data management agent may handle data generated or used by two or more applications.

Each computing device 205 may also include a data distribution and live browsing client module 405 (herein "distribution client module"). The distribution client module 405 is responsible for, inter alia, associating mobile devices and/or hosted service accounts with users of the information management system, setting information management policies for mobile and other computing devices, pushing data objects to a distribution module for distribution to other computing devices, providing unified access to a user's data via an interface, and providing live browsing features. The various functions of the distribution client module are described in greater detail herein.

A media agent 410, which may be implemented as a software module, conveys data, as directed by the storage manager 402, between a computing device 205 (or hosted service 122) and one or more non-production storage mediums 155-870. Each media agent 410 may control one or more intermediary storage devices 418, such as a cloud server or a tape or magnetic disk library management system, to read, write, or otherwise manipulate data stored in a non-production storage medium 155-870. Each media agent 410 may be considered to be "associated with" a storage device and its related non-production storage media if that media agent is capable of routing data to and storing data in the storage media managed by the particular storage device. A media agent may communicate with computing devices 205, hosted services 122, storage devices 418A-D, and the storage manager 402 via any suitable communications path, including SCSI, a Storage Area Network ("SAN"), a Fibre Channel communications link, or a wired, wireless, or partially wired/wireless computer or telecommunications network, including the Internet.

To perform its functions, the media agent 410 may include a media file system module 425, a data classification module 435, a content indexing module 420, a deduplication module 430, an encryption module 475, a compression module 485, a network module 415, a distribution module 490, and a media agent database 440. The media file system module 425 is responsible for reading, writing, archiving, copying, migrating, restoring, accessing, moving, sparsifying, deleting, sanitizing, destroying, or otherwise performing file system operations on various non-production storage devices of disparate types. The media file system module may also instruct the storage device to use a robotic arm or other retrieval means to load or eject certain storage media such as a tape.

The network module 415 permits the media agent to communicate with other components within the system and hosted services 122 via one or more proprietary and/or non-proprietary network protocols or APIs (including cloud service provider APIs, virtual machine management APIs, and hosted service provider APIs). The deduplication module 430 performs deduplication of data objects and/or data blocks to reduce data redundancy in the cell. The deduplication module may generate and store data structures to manage deduplicated data objects, such as deduplication tables, in the media agent database 440. The encryption module 475 performs encryption of data objects, data blocks, or non-production objects to ensure data security in the cell. The compression module 485 performs compression of data objects, data blocks, or non-production objects to reduce the data capacity needed in the cell.

The content indexing module 420 analyzes the contents of production copies or non-production copies of data objects and/or their associated metadata and catalogues the results of this analysis, along with the storage locations of (or references to) the production or non-production copies, in a content index stored within a media agent database 440. The results may also be stored elsewhere in the system, e.g., in the storage manager 402, along with a non-production copy of the data objects, and/or an index cache. Such index data provides the media agent 410 or another device with an efficient mechanism for locating production copies and/or non-production copies of data objects that match particular criteria. The index data or other analyses of data objects or metadata may also be used by the data classification module 435 to associate data objects with classification identifiers (such as classification tags) in the media agent database 440 (or other indices) to facilitate information management policies and searches of stored data objects.

The distribution module 490 may be a set of instructions that coordinates the distribution of data objects and indices of data objects. The distribution may occur from one computing device 205 to another computing device 205 and/or from hosted services 122 to computing devices 205. As a first example, the distribution module may collect and manage data and metadata from hosted services 122 or mobile devices 205. As another example, the distribution module may synchronize data files or other data objects that are modified on one computing device so that the same modified files or objects are available on another computing device. As yet another example, the distribution module may distribute indices of data objects that originated from multiple computing devices and/or hosted services, so a user can access all of their data objects through a unified user interface or a native application on their computing device. The distribution module may also initiate "live browse" sessions to permit communications between different computing devices so that the devices can interchange data and metadata or so the devices can provide computing resources, such as applications, to each other. The functions performed by the distribution module are described in greater detail herein.

Suitable Computer Network

Figure 5A:
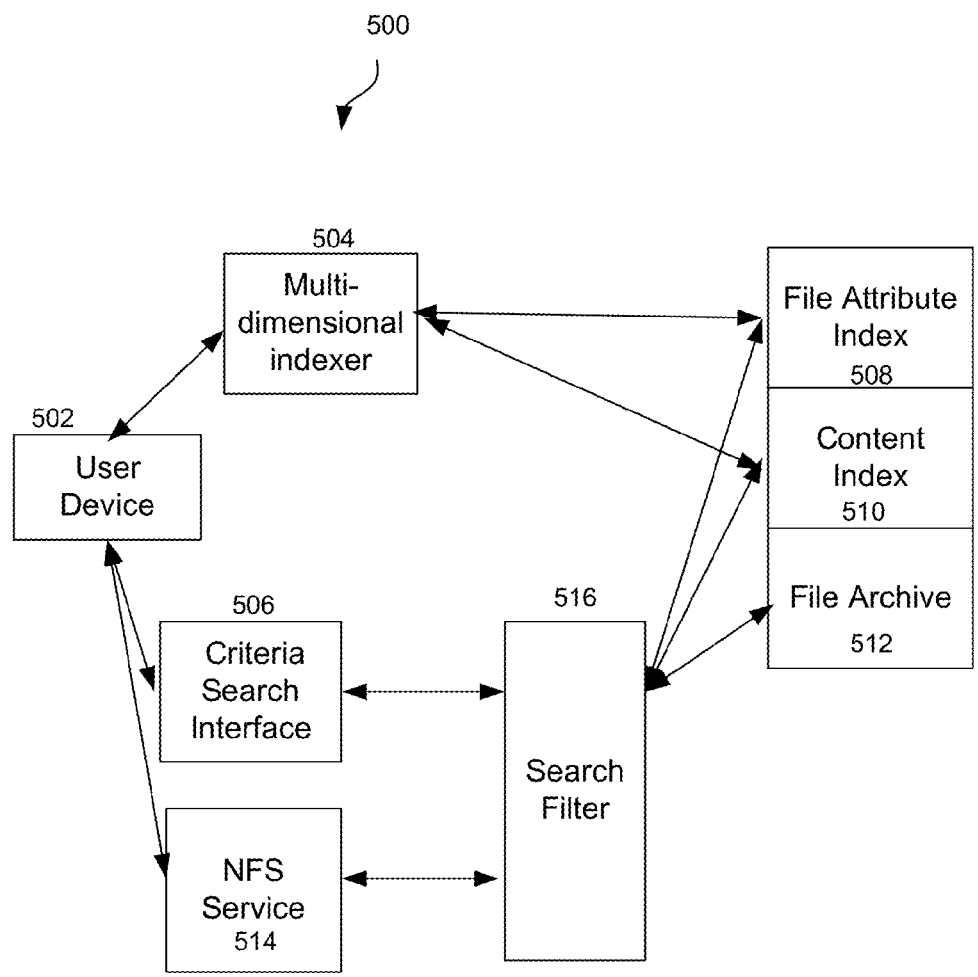
FIG. 5A is an architectural block diagram of a suitable computer network.

FIG. 5A is a block diagram depicting certain functional blocks of a search file system 500. Files may be transferred to/from a user device 502 to an archive or a secondary storage (not shown in FIG. 5A) as further described below. When files from the user device 502 are archived or transferred from a primary storage on the user device 502 to a secondary storage or an archive, a multi-dimensional indexer 504 may operate on the files to generate one or more of: a file attribute index 508, a content index 510 and a file archive 512, each of which are described herein. The multi-dimensional indexer 504 may be implemented as a part of the previously described media agent or may be executed as a separate application.

The user device 502 may be any computing platform such as a mobile phone, a smartphone, a tablet, a handheld computer, a laptop, a desktop, a server, and so on. No assumptions are made about any specific operating system being available on the user device 502. The user device 502 may be battery operated or may be powered from a power outlet.

In some implementations, the multi-dimensional indexer 504, which is further described below, may be implemented on the user device 502. In some implementations, the multi-dimensional indexer 504 may be implemented as a part of the media agent (previously discussed) on a hardware platform that is coupled to the user device 502 via a computer network. Other implementations are possible in which a portion of the indexing is implemented on the user device 502 and another portion of the indexing is implemented on another computer. For example, in one implementation, file attribute indexing, which typically needs low computational resources, may be performed on the user device 502, while content indexing, which typically needs higher computational resources, may be performed on another server in the network.

Multi-Dimensional Indexing

The multi-dimensional indexer 504 may in general operate on files from a user device 502 that are being transferred to a secondary storage or an archive. The transfer of file may be being performed by an explicit command from a user or due to an implicit command such as a scheduled backup operation or a system administrator controlled backup of certain files and folders from the user device 502.

In some implementations, the multi-dimensional indexer 504 may perform a file attribute indexing operation on a file being archived. It is well known that computer files have attributes such as file name, edit time, author name, last saved, file type, file size, and so on. Several techniques, e.g., C-tree based indexing, are well known in the art for indexing files based on file attributes. A description of these well-known techniques is omitted from this document for brevity.

In some implementations, the multi-dimensional indexer 504 may perform content indexing on the file being archived. The content of the file may be indexed along several "dimensions" or attributes of the content of the file. For example, a textual content indexer may identify and index words or phrases occurring in the file. A picture content indexer may identify types and number of pictures embedded in a document. In some implementations, the picture content indexer may use pattern recognition techniques to extract content information from the images (e.g., face identification, natural light/flash photograph, does the image include flowers, trees, humans, blue sky, etc.). The picture attributes may be generated on-the-fly or may be generated based on a pre-determined set of picture attributes that the picture content indexer is programmed to look for. A video content indexer may similarly perform pattern recognition, scene recognition, key frame indexing (e.g., frames that are self-encoded and can be used for trick modes such as fast forwarding or rewinding), etc. on a video file being archived. An audio content indexer may perform indexing that uses audio recognition techniques such as genre detection, musical instrument detection, song recognition based on tune matching, etc.

The various indices generated by the multi-dimensional indexer 504 during the archiving of a file or a folder that contains one or more files or folders may be stored in three logical groups of indexed information: A file attribute index 508, a content index 510 and the archived file version 512 (which has been discussed previously). While the indices 508, 510, 512 are described as being different logical groups; such grouping is only being made for the sake of clarity of explanation. In actual implementations, the logical groups may be implemented as a single or multiple databases and may be stored on the same computer or distributed across different platforms in a network.

In some implementations, the file attribute index 508 contains "black box" information or metadata about a file that is generally independent of the actual content of the file. This information may include, e.g., file size, last edit time, last modified by field, creation time, last printed time, user or users authorized to read the file, and so on.

In some implementations, the content index 510 includes information characterizing the contents of a file, which is generally independent of the "black box" features. For example, as previously described the content index may include information about whether content includes audio, video, images, identification of a topic of the document based on text keywords, whether the file includes embedded macrocode, and so on.

Criteria Search Interface

When searching for files in archives, a user may be able to access a criteria search interface 506 using his user device 502. In different implementations, the criteria search interface 506 may be invoked on the same platform as the user device 502, or may be invoked on another server, with the user being able to interact with the criteria search interface 506 over a network connection. As further described below, the criteria search interface 506 may allow a user to search a file archive or a secondary storage (e.g., file archive 512). The search results may be presented to the user using a standard mechanism such as a Network File System (NFS) service 514 mechanism. In one aspect, a Search Filter 516 may make available for user interaction through the NFS service 514, the files and folders from the file archive 512 that meet the user's search criteria.

One beneficial aspect of such a presentation of files to the user may be that the user is able to view and interact with file listings using a familiar file and folder interface. Another beneficial aspect may be that only files that the user may be interested in are displayed in the listing presented to the user. Another advantageous aspect may be that the files made available by the Search Filter 516 may be mounted to a drive using well known NFS mechanism, thereby allowing user interaction such as play, open, copy, move, delete, etc. without having to change user experience for executing such commands and without having to write additional software for implementing such commands. Another beneficial aspect of mounting files (or file clips) that meet the user's search criteria using NFS 514 may be that such selective mounting from the File Archive 512 may produce expedient response from the system because the system need not mount the entire File Archive 512 before allowing browsable access to a user.

Search Filtered File System

Figure 5B:
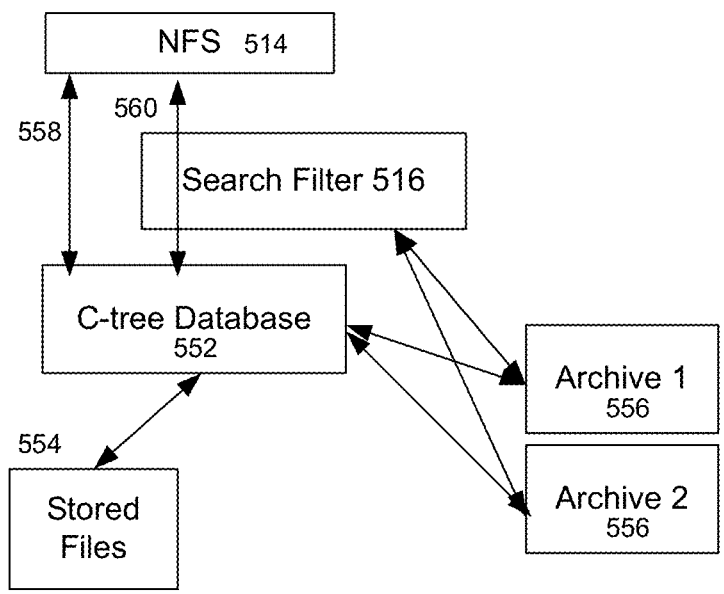
FIG. 5B is a block diagram depiction of the operation of a Search Filtered File System.

FIG. 5B is a block diagram depicting an example of the operation of a search filtered file system. In some implementations without the search filter 516 described above, the NFS interface 514 that enables a user to search through network files may exchange messages 558 with a c-tree database 552 that provides the NFS interface 514 with information regarding files and folders available on stored files 554 in the network. The c-tree database 552 may include information about files stored in archives or secondary storages 556. However, files stored in a typical file archive are deduplicated and encoded to achieve data compression (not in a native format), and therefore may not be accessible via the NFS 514 for user interaction such as open, close, move, copy, etc.

In some implementations, the search filter 516 may operate at a protocol layer between the NFS 514 and the database 552 (e.g., a C-tree database) such that the search filter 516 traps communication between the NFS 514 and the database 552. In addition, as previously described, the search filter 516 may mount a file system from the archive based on a user search of the archive such that the search filtered file system is copied into a local cache in the non-archived (e.g., non-deduplicated and non-compressed) format. When the NFS service 514 wishes to access a file that is listed in the search filtered file system, such a seek request 560 is trapped by the search filter 516. In response to such a call, the searched file system reports back the search results that were copied to the local cache from the archive, making these results available to the NFS service 514 for user interaction.

In some implementations, the search filter 516 may provide a database of the search filtered files to the NFS 514. In one aspect, the search filtered file may therefore appear to a user as a "normal" network file system, while the search filter 516 performing the task of translating various NFS commands into corresponding acts of files in the file archive. Therefore, tasks such as figuring out where in an archive the given file is located, how many blocks (in size) are occupied by the file and de-archiving the file are coordinated by the search filter 516 transparently to the user and the NFS 514.

Figure 6:
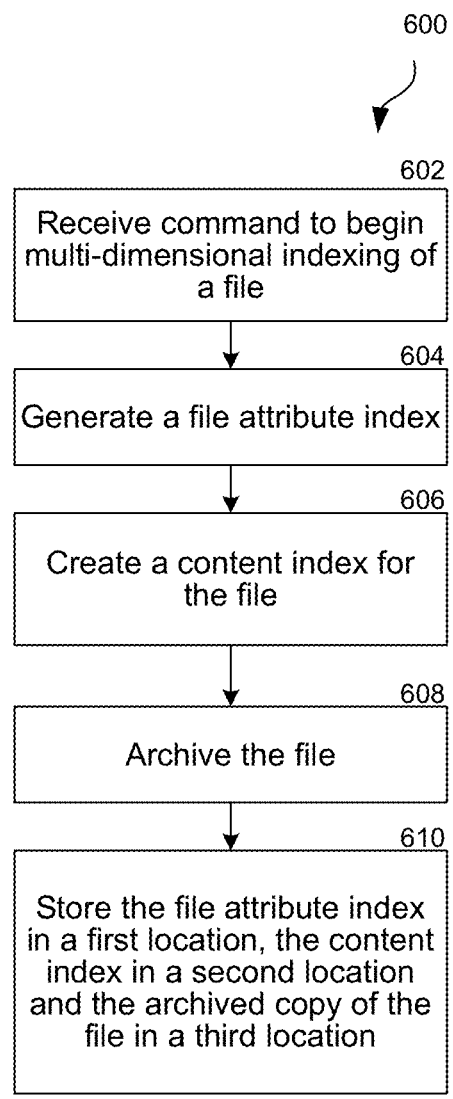
FIG. 6 is a flow chart representation of a multi-dimensional indexing process.

FIG. 6 is a flow chart description of a procedure 600 of indexing data files being archived. As previously described, the procedure 600 may be implemented on a user's computer, on a media agent platform or a combination of the two.

At 602, a command to begin multi-dimensional indexing of a file is received. As discussed previously, the command may be explicitly issued by a user, or may be implicitly generated based on a pre-scheduled archival of the file.

At 604, a file attribute index is generated. The file attribute index includes information related to extrinsic properties of a file, such as file size, last edited time, author, authorized users, etc. For example, when the item being indexed is an email, the file attribute index may include information regarding date the email was sent, to whom, from whom, type of attachment (if any), etc.

At 606, a content index is generated for the file. The content index includes information related to intrinsic properties of the file. As previously described, the information included in the content index may include adjectives and labels characterizing content of the document, described content of a video, identifying a tune, and so on.

At 608, the file is archived in a secondary storage. In various implementations, secondary storage may be located at a storage system external to the user's computer and may include a tape drive, a disk array, a cloud storage, etc.

At 610, the file attribute index 508 is stored at a first location, the content index 510 is stored at a second location and the archived copy of the file is stored at a third location (although such locations may be different logical locations on the same storage device). Information about the first, second, and third locations, and associations of the archived copy of the file with the corresponding index data are also stored for use during the below described search process. The three locations may be the same or different locations. For example, in some implementations, the file attribute index 508 is generated and stored locally at the user device 502, the content index 510 is generated at a media agent 410 and stored locally on the media agent platform, and the archived copy of the file is stored at a tape drive. In some other implementations, both the file attribute index 508 and the content index 510 may be stored locally at the user device 502, e.g., to facilitate quick access to the stored information by a user and the archived copy is stored on a secondary storage device such as a cloud-based server. These implementations may be especially advantageous to wireless/mobile user devices 502 by storing all the information needed for browsing the archived file at the user device 502, and making the archived file available any time, and at any location, through the cloud-based archive storage. In some implementations, the file attribute index 508 and content index 510 may be stored at the media agent platform and the archive file may be stored at a backup storage system. These embodiments may be especially useful in corporate or managed networks by making the archived file and the corresponding index information available to other users or system administrators even when the user device 502 is turned off or not connected to the managed network. Example data structures suitable for storing the indexed information are described next.

Storing Multi-Dimensional Indexing Data

Figure 7:
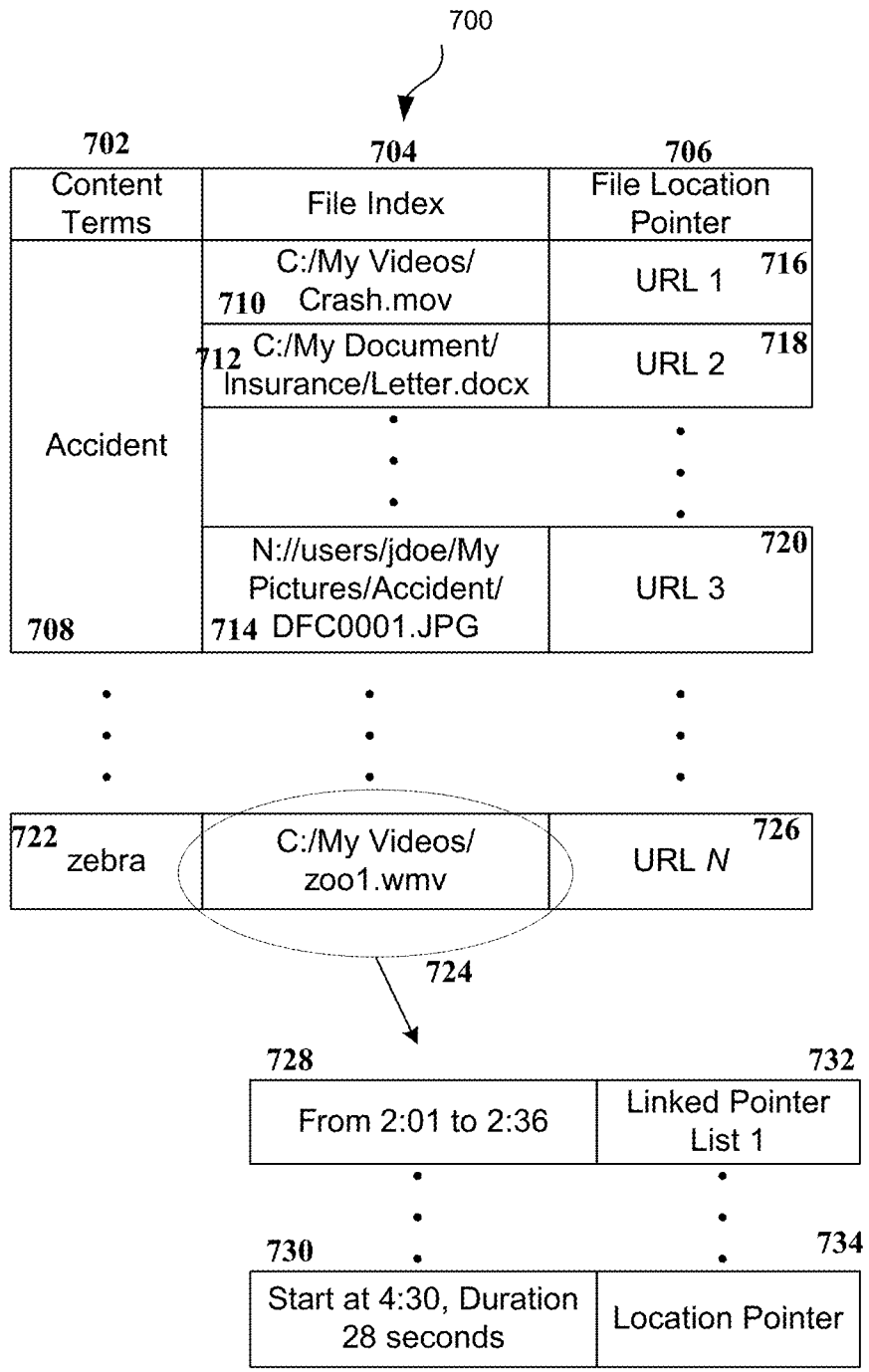
FIG. 7 is an example data structure used for storage of indexed archive files in a secondary storage device.

FIG. 7 depicts example data structures 700 suitable for storage of indexing information discussed herein. File contents may be stored in a database as content word or phrase entries, and the files in which each word entry occurs. For example, column 702 represents a listing of various terms and phrases that were generated during content indexing of files in a file archive. The column 704 may list each file within the file archive for which the given term was generated during the indexing. The files corresponding to a given term entry may be ordered using a rule such as the file having maximum occurrences of the term may be listed first. For each file in which a given term occurs, column 706 may include a file location pointer indicative of where to locate the file.

The depicted example in FIG. 7 shows that the term "Accident" (entry 708) was indexed during indexing of the file "crash.mov" (entry 710), the file "letter.docx" (entry 712) and the image file DFC0001.JPG (entry 714). As an illustrative example, the term "accident" may have been generated during the content indexing of crash.mov based on the occurrence of the word "accident" in the metadata description (or critics review) associated with the file crash.mov. As an illustrative example, the word "accident" may have been generated during content indexing of the file letter.docx because the text in the file may include the term "accident." As an illustrative embodiment, the word "accident" may be generated during context indexing of the image DFC0001.JPG because the image is stored in a folder having the word "accident" in the folder name. Various other rules of associating files with search terms, not explicitly discussed in this document, are well known in the art.

The column 706 illustrates that file locators (boxes 716, 718, 720, 726) may be stored for each entry in the file index 704. The file locators 716, 718, 720, 726 may be in the form of a universal resource locator (URL), or a filename (including the entire directory structure), or a filename and an offset within the file, and so on. In one aspect, the file locators 716, 718, 720, 726 associated with a file index entry may have sufficient information to enable mounting to a drive such that the file is viewable and can be interacted with the NFS 514 interface, as previously discussed. In some implementations, the file locators 716, 718, 720, 726 may include number of data blocks (or bytes) within the file archive where the indexed file (or portion of the file) can be retrieved from (or tape offsets and extents for files stored on sequential media like magnetic tape).

Content Indexing of Media Files

As further depicted in FIG. 7, another content term "zebra" (entry 722) may have been generated during indexing of a video file "c:/MyVideos/zoo1.wmv" (box 724). In some implementations, media files such as video files may be indexed both as a whole and in pieces by the multi-dimensional indexer 504. One dimension of indexing may simply parse through metadata associated with the video file and index the metadata. The use of container tracks for providing information about video files is well known in the art. The metadata may be a part of the video file or may be stored in a separate file associated with the video file.

For the above-discussed example of a media file index entry in box 724, the multi-dimensional indexer 504 may generate a clip-wise content index to facilitate random access within the media file. For example, "zoo1.wmv" may be a home video of a user that may be a 30 minute video file. However, a "zebra" may appear in the home video only from duration 2 minutes 01 seconds to 2 minutes 36 seconds (box 728). The multi-dimensional indexer may obtain the start-time, end-time information using, e.g., a content pattern recognition engine or using metadata associated with the video file. The multi-dimensional indexer 504 may include such start-time, end-time information in the file index generated for a media file. The multi-dimensional indexer 504 may further associate a list of pointers, links or URLs (box 732) that allow independent access to portions of the video file when presenting the search results to the user, as further described below. One location pointer in the list (e. g., the first URL) may contain location information for a preview frame associated with the clip portion. Other ways to provide direct access to portions of a media file are possible, e.g., box 730, which shows indexing in the form of a start time (4 minutes 30 seconds into the video) and a duration of the clip of interest (28 seconds), with an associated location pointer 734 to the beginning of the clip or the preview frame for the clip.

Criteria-Based Search of the Search File System

Figure 8:
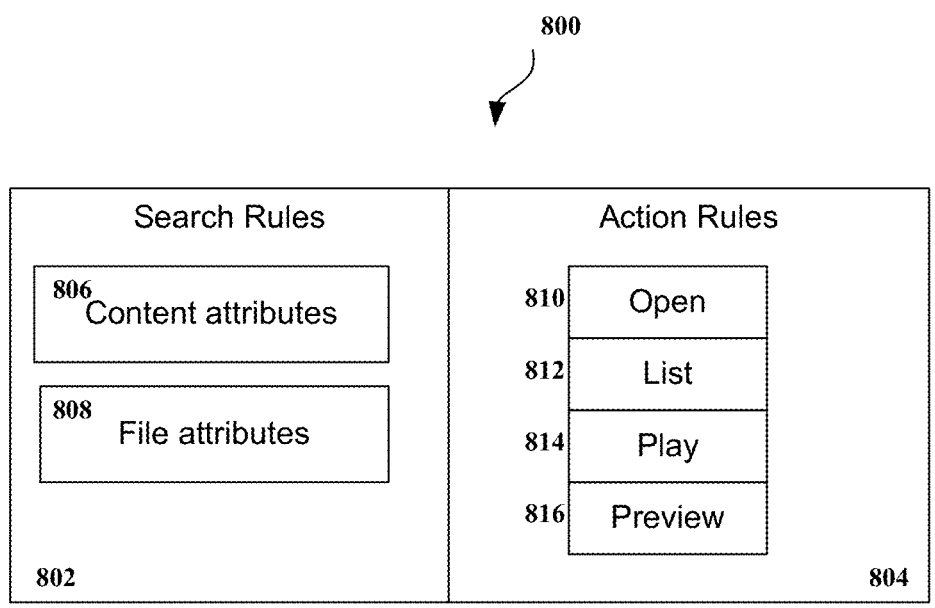
FIG. 8 is an example menu screen available to a user for criteria-based search of an archive.

FIG. 8 illustrates a search menu interface 800 presented to a user for browsing through archived files while looking for certain files that meet the user's search criteria. A search rules portion 802 may be provided for the user to be able to specify search rules. The search rules specified by the user may be used by the Search Filter 516 in selectively presenting files from the File Archive 512 that meet the search rules. The search menu interface 800 may include an action rules portion 804 that allows a user to specify actions to be taken on files that are found as a result of the search. Note that the action rules portion 804 is optional and may be eliminated in certain implementations so that the action taken upon files found may simply depend on the file types, as is typically implemented in commonly used operating systems.

The search rules portion 802 may include content attribute menus 806 and file attribute menus 808. The content attribute menus 806 may allow a user to specify search keywords, phrases, etc., as is well known in the field of Internet searching. The file attribute menus 808 may allow a user to specify file characteristics, such as "modified before," archived before," a file type, file size constraints, and so on. Note that while the content attribute menus 806 and file attribute menus 808 are depicted as separate areas for the sake of illustration and explanation, in some implementations, these two menus may be unified. For example, it is well known in the art of Internet searching that search keywords can be terminated with special phrases such as "filetype:ppt" etc. to narrow the search results based on attributes of files in which the search results are located.

The action rules portion 802 may includes several action options 810, 812, 814, 816 etc. For example option 810 may be selected by a user to automatically open a file (or files) upon search. The option 812 selected by the user may specify that the search results may simply be listed, e.g., using the NFS interface 514. The option 814 may be selected by the user to indicate that a media file obtained as a result of the search should be played upon finding. In some implementations, to avoid multiple simultaneous audio/video playbacks, this option may limit the playback to a single search file— e.g., the first found file, or the file that matches the search criteria the closest. The option 816 may be selected by the user to enable preview of one or more files found upon search. Various techniques for previewing files are possible, e.g., as disclosed in the assignee's U.S. patent application No. 61/618,039, to Liu et al., incorporated by reference herein.

Presenting Search Results

Figure 9:
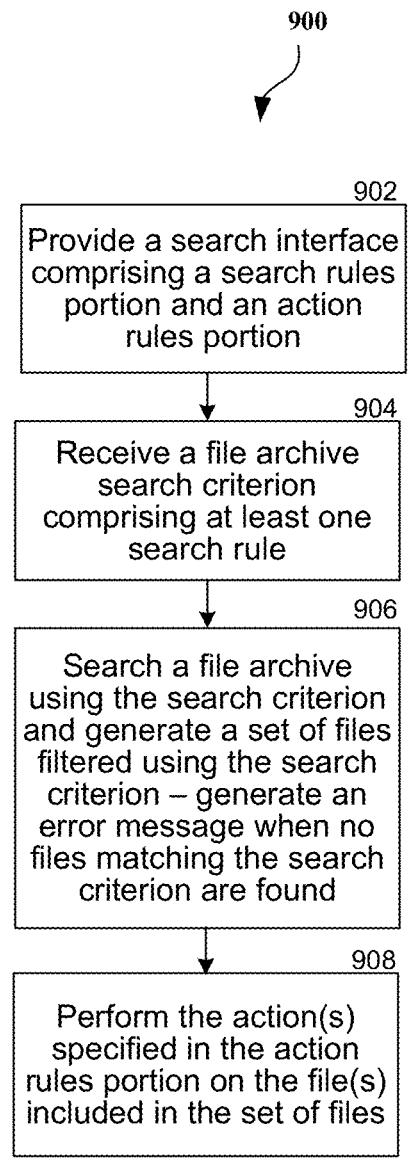
FIG. 9 is a flow chart representation of a process of providing file search results to a user.

FIG. 9 is a flow chart representation of a process 900 of presenting search results to a user, based on a filtered search of a file archive. The process 900 may be implemented on the user device 502, a media agent platform or another computer.

At 902, a search interface (e.g., 800) comprising a search rules portion and an action rules portion is presented by the process 900 to a user.

At 904, a file system search criterion comprising at least one search rule is received by the process 900. The search criterion may be, e.g., based on user selection of menus using the search interface 800.

At 906, the process 900 searches a file archive using the search criterion (or criteria) and a set of files that are filtered using the search criterion (e.g., files that include the text phrase being search for) is generated. If no files matching the search criterion are found, an error message is generated. The error message may prompt the use to expand his search or may simply report that no files were found. As previously described, the search results may be made available to the directory search module on the user's device so that the search results presented to the user have the same look and feel as the native directory browsing application and the user gets a seamless experience in browsing search results.

At 908, an action (or actions) specified in the action rules portion may be performed on the set of files generated above. In some implementations, the action rules may be "implicit" as previously described, and the corresponding action may be triggered based on the type of file found (e.g., a "hidden" file may be omitted from the display, a picture file may be presented as a thumbnail, a video file may be presented using a freeze frame, etc.).

Presenting Search Filtering Media Files

Multimedia file handling poses a special problem for the above-discussed search filtered file system because first, mounting of an entire media file, which may be several tens of Megabytes to Gigabytes in size) may require a large amount of network bandwidth and computational resources. In addition, the mounting process may take an amount of time that some users may find unacceptable. Furthermore, even when the resulting file is mounted and made available for user interaction, e.g., through the NFS 514, a user may find it cumbersome to have to play back the media file; manually searching for what the user was looking for. For example, in the example previously discussed, when a user is looking for a "zebra" video, the video of interest may be only few seconds long in a video file that may have a 30 minutes playback duration. In addition, some user devices 502 may not have sufficient memory or battery power to mount back a long media file locally and play back the entire file while the user looks for the content of interest. Even when a small clip of the content of interest is NFS mounted, a user may want to view video before or after the clip, which may not be locally available at a user device's primary storage, thereby leading to large delays while additional content is fetched from elsewhere.

The special media file handling disclosed herein is useful in addressing the above-discussed operational issues, and other issues. In some implementations, large video files are indexed as small video clips and corresponding linked lists of pointers are stored. In one aspect, this arrangement allows for random access to a smaller portion within the large media file. The Search Filter 516, e.g., may filter only the relevant video clips from a large media file and mount the clips from the file archive 512 to the directory listing of search filtered file system presented to the viewer. It will be appreciated by one of skill in the art that such mounting of a smaller portion of a file (e.g., a 2 Megabyte portion of a 100 Megabyte file) is resource-efficient and may provide a much faster response time to the user's searches. To facilitate direct access to portions of a media file, in some implementations, when archiving, the media file itself may be split into multiple smaller portions that are stored as individual files.

When a user selects to play back the search results, (e.g., play option 814), an appropriate application program (e.g., Windows Media Player or QuickTime player) may be invoked. A playback software agent executed on the user device 502 may monitor the playback operation of a file from the search filtered file system. Depending on the current time of playback or where within the clip a user's current playback time is, the playback software agent may speculatively fetch additional media data representing content before or after play time of the content currently mounted and being played. The playback software agent may similarly trap user interactions with the application program (e.g., fast forward, rewind, pause) to appropriately fetch additional data from the file archive, delete data from a local cache or neither delete nor fetch additional data (e.g., when a user pauses the playback).

Figure 10:
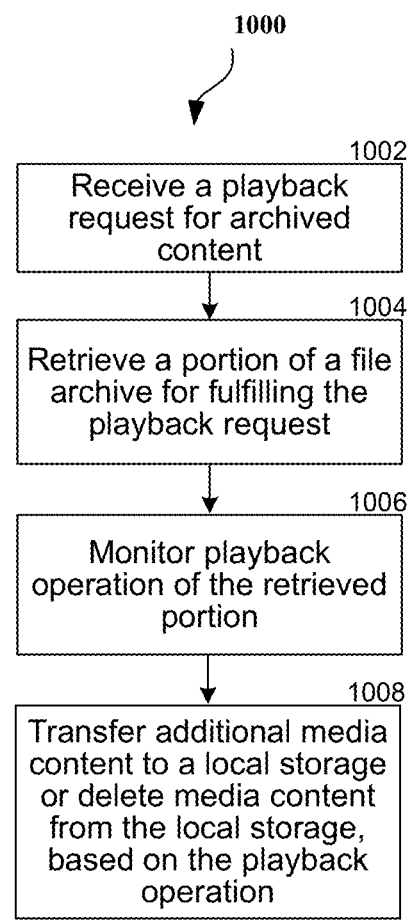
FIG. 10 is a flow chart representation of a process of providing media content search results to a user.

FIG. 10 is a flow chart representation of a process 1000 of playing back media files from a search filtered file system. In some implementations, the process 1000 is implemented on the user device 502.

At 1002, a playback request is received for archived content. The playback request may be issued by a user based on search results presented to the user, or automatically triggered based on an association between a known file type for a file found in the search results, as previously discussed.

At 1004, a portion of content is retrieved from a file archive for fulfilling the playback requested. The retrieval process may, e.g., include reversing the compression, de-duplication, etc. performed on the content to present the content in its native (or original unarchived) format. The portion of content may correspond to, e.g., a time segment of the content that was identified by the search filter.

At 1006, the process 1000 monitors the playback of the content. The process 1000 monitors, e.g., the progress of the playback and how much additional data or time is remaining before the user device 502 runs out of content to be presented to the user. The process 1000 may additionally take into account the amount of time it takes to restore a next segment of content from the file archive.

Depending on the results of the monitoring, at 1008, additional media content is transferred (by performing a similar reversing operation) from the archive to a local storage (e.g., play cache for the playback) or data may be deleted from the local storage, depending on the playback operation.

One of skill in the relevant art will appreciate that several techniques have been disclosed for providing a search filtered file system to a user using a file archive in a secondary storage. In one aspect, the search results are filtered to only show files that match the search criteria. In another aspect, media files are presented in smaller, independently accessible portions. It will further be appreciated that the disclosed techniques facilitate quick searching and previewing of archived content.

Conclusion

Systems and modules described herein may comprise software, firmware, hardware, or any combination(s) of software, firmware, or hardware suitable for the purposes described herein. Software and other modules may reside on servers, workstations, personal computers, computerized tablets, PDAs, smart phones, and other devices suitable for the purposes described herein. Modules described herein may be executed by a general-purpose computer, e.g., a server computer, wireless device, or personal computer. Those skilled in the relevant art will appreciate that aspects of the invention can be practiced with other communications, data processing, or computer system configurations, including: Internet appliances, hand-held devices (including personal digital assistants (PDAs)), wearable computers, all manner of cellular or mobile phones, multi-processor systems, microprocessor-based or programmable consumer electronics, set-top boxes, network PCs, mini-computers, mainframe computers, and the like. Indeed, the terms "computer," "server," "host," "host system," and the like, are generally used interchangeably herein and refer to any of the above devices and systems, as well as any data processor. Furthermore, aspects of the invention can be embodied in a special purpose computer or data processor that is specifically programmed, configured, or constructed to perform one or more of the computer-executable instructions explained in detail herein.

Software and other modules may be accessible via local memory, a network, a browser, or other application in an ASP context, or via another means suitable for the purposes described herein. Examples of the technology can also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other interfaces suitable for the purposes described herein.

Examples of the technology may be stored or distributed on computer-readable media, including magnetically or optically readable computer disks, hard-wired or preprogrammed chips (e.g., EEPROM semiconductor chips), nanotechnology memory, biological memory, or other data storage media. Indeed, computer-implemented instructions, data structures, screen displays, and other data under aspects of the invention may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme).

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the invention provided herein can be applied to other systems, not necessarily the systems described herein. The elements and acts of the various examples described above can be combined to provide further implementations of the invention.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

These and other changes can be made to the invention in light of the above Detailed Description. While the above description describes certain examples of the invention and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

While certain examples are presented below in certain forms, the applicant contemplates the various aspects of the invention in any number of claim forms. Accordingly, the applicant reserves the right to add additional claims after filing the application to pursue such additional claim forms for other aspects of the invention.

The invention claimed is:

1. A method of archiving a file to secondary storage in an information management system, the method comprising:
    archiving a file to secondary storage, by a media agent component of the information management system that has been identified for archiving the file, wherein the archiving comprises:
        (a) dividing the file being archived into a plurality of independently accessible smaller portions of an archive copy of the file, and
        (b) multi-dimensional indexing of the file being archived, wherein the multi-dimensional indexing comprises:
            (i) generating a file attribute index, which includes extrinsic information about the file being archived that is independent of file contents, and
            (ii) generating a content index of at least one of: text content, picture content, video content, and audio content of the file being archived, and
        (c) wherein each independently accessible smaller portion in the plurality of independently accessible smaller portions of the archive copy is identified at least once in at least one of the file attribute index and the content index;
    providing to a user of the information management system a fast-forward progression through the plurality of independently accessible smaller portions of the archive copy without restoring each independently accessible smaller portion from secondary storage,
        wherein the fast-forward progression is based on searching at least one of the file attribute index and the content index; and
    restoring a first independently accessible portion of the archive copy to a user-device component of the information management system without having to also restore the other independently accessible smaller portions of the archive copy,
        wherein the first independently accessible smaller portion of the archive copy is found by a search filter searching at least one of the file attribute index and the content index within the information management system.

2. The method of claim 1 further comprising:
    providing a user of the information management system with a search utility coupled to the search filter, wherein the search utility is based on multi-dimensional indexing performed in the course of archiving a plurality of files in the information management system; and
    restoring from secondary storage only those archive copies or independently accessible smaller portions thereof that satisfy the user's search criteria, based on a respective file attribute index and content index associated with each archive copy.

3. The method of claim 1, wherein the file attribute index and the content index are located on the user-device component of the information management system; and
    wherein the archive copy is located on a secondary storage component which is distinct from the user-device component.

4. The method of claim 1, wherein generating the content index comprises pattern recognition that extracts content information about one or more images in the file being archived.

5. The method of claim 1, wherein generating the content index comprises pattern recognition that extracts content information about one or more audio sequences in the file being archived.

6. The method of claim 1, wherein generating the content index comprises pattern recognition that extracts content information about one or more video sequences in the file being archived.

7. The method of claim 1, wherein the multi-dimensional indexing comprises generating pointers to the locations in the secondary storage of each respective independently accessible smaller portion of the archive copy.

8. The method of claim 1 further comprising:
    storing the content index to a first location where the content index may be searched by the search filter, wherein the first location is in the primary storage; and
    storing the file attribute index to a second location where the file attribute index may be searched by the search filter, wherein the second location is also in the primary storage.

9. The method of claim 1 further comprising:
    storing the content index to a first location where the content index may be searched by the search filter, wherein the first location is associated with the media agent; and
    storing the file attribute index to a second location where the file attribute index may be searched by the search filter, wherein the second location is also associated with the media agent.

10. A method comprising:
multi-dimensional indexing of a file being archived to secondary storage in an information management system, by a multi-dimensional indexer,
  wherein the file being archived is stored in primary storage which is in communication with a user computing device, and
  wherein the multi-dimensional indexing comprises:
    (a) generating a file attribute index, which includes extrinsic information about the file being archived that is independent of contents of the file, and
    (b) generating a content index based on at least one of: text content, picture content, video content, and audio content of the file being archived;
archiving the file to secondary storage, by a media agent component of the information management system,
  wherein the file archiving includes dividing the file into a plurality of independently accessible smaller portions of an archive copy of the file being archived, and
  wherein each independently accessible smaller portion in the plurality of independently accessible smaller portions of the archive copy is identified at least once in at least one of the file attribute index and the content index;
providing to a user of the information management system a fast-forward progression through the plurality of the independently accessible smaller portions of the archive copy without restoring from the secondary storage each independently accessible smaller portion,
  wherein the fast-forward progression is based on searching at least one of the file attribute index and the content index;
restoring a first independently accessible smaller portion of the archive copy to the primary storage in communication with the user computing device, without also restoring from the secondary storage the other independently accessible smaller portions in the plurality of independently accessible smaller portions of the archive copy; and
wherein the multi-dimensional indexer executes as computer-executable instructions on a hardware processor coupled to non-transitory computer memory storing the instructions.

11. The method of claim 10 wherein the hardware processor is part of the user computing device that is in communication with the primary storage.

12. The method of claim 10 wherein the hardware processor is part of a secondary storage computing device that executes the media agent component of the information management system.

13. The method of claim 10 further comprising:
accessing, by the user computing device, the restored first independently accessible smaller portion of the archive copy in the primary storage.

14. The method of claim 10, wherein the restoring is performed by a media agent component of the information management system.

15. The method of claim 10, wherein the restoring is performed by a media agent component of the information management system in response to an indication received from the user computing device searching at least one of the file attribute index and the content index.

16. The method of claim 10 wherein the file being archived is a media file, and wherein the restored first independently accessible smaller portion of the archive copy comprises a picture that satisfies a search criterion.

17. The method of claim 10 wherein the file being archived is a media file, and wherein the restored first independently accessible smaller portion of the archive copy comprises an audio segment that satisfies a search criterion.

18. The method of claim 10 wherein the file being archived is a media file, and wherein the restored first independently accessible smaller portion of the archive copy comprises a video segment that satisfies a search criterion.

19. The method of claim 10 further comprising:
providing the user of the information management system with a search utility for searching the secondary storage based on the multi-dimensional indexing; and
wherein the restoring comprises mounting to the primary storage only such independently accessible smaller portions of the archive copy that satisfy search criteria supplied by the user and applied by the search utility.

20. A computer-readable storage medium, excluding transitory propagating signals, storing instructions that, when executed by a processor, cause the processor to execute a method of enabling a user to search from a user-device for content stored in a file archive of an information management system, based on multi-dimensional indexing of a plurality of files archived to the file archive, the method comprising:
providing a search interface;
receiving a search criterion;
searching, based on the search criterion, indexing information about the file archive, which comprises respective archive copies of the plurality of files archived to the file archive,
  wherein the indexing information comprises, for each respective archive copy in the file archive:
    (i) a file attribute index generated by a media agent when the respective file was archived to the file archive, and
    (ii) a content index generated by at least one of the media agent and a user-device when the respective file was archived to the file archive,
  wherein the content index indexes at least part of the contents of the file being archived based on at least one of: text content, picture content, video content, and audio content, and
  wherein the search criterion indicates at least one of: text content, picture content, video content, and audio content to be searched for; and
performing an action on a first archive copy in the file archive, which archive copy satisfies the search criterion used in the searching,
  wherein the action comprises providing a fast-forward progression through a plurality of smaller portions of the archive copy without individually restoring the smaller portions of the archive copy,
  wherein the fast-forward progression is based on searching at least one of the file attribute index and the content index of the archive copy, and
  wherein each of the smaller portions of the archive copy is indexed at least once, during the archiving of the file to the file archive, in at least one of the file attribute index and the content index of the archive copy, and may be restored to the user-device without the other smaller portions of the archive copy also being restored.

21. The computer-readable storage medium of claim 20 wherein the method further comprises:
mounting the archive copy that satisfies the search criterion used in the searching to a drive accessible by the user-device using a network file system (NFS) interface without also mounting archive copies that do not satisfy the search criterion.

22. The computer-readable storage medium of claim 20 wherein the method further comprises:
mounting the archive copy that satisfies the search criterion used in the searching to a drive accessible by the user-device using a network file system (NFS) interface without also mounting archive copies that do not satisfy the search criterion; and
restoring to the user-device a first smaller portion of the archive copy without also restoring the other smaller portions of the archive copy.

23. The computer-readable storage medium of claim 20 wherein the method further comprises:
mounting the archive copy that satisfies the search criterion used in the searching to a drive accessible by the user-device using a network file system (NFS) interface without also mounting archive copies that do not satisfy the search criterion;
restoring to the user-device a first smaller portion of the archive copy in response to a user command indicating the first smaller portion; and
restoring to the user-device, without receiving a further user command, a second smaller portion of the archive copy which, according to the content index, is immediately before or immediately after the first smaller portion of the archive copy in the fast-forward progression; and
wherein the first and second smaller portions are restored without also restoring the other smaller portions of the archive copy.

* * * * *